Sept. 2, 1924.  S. DI PAOLA ET AL  1,507,163
HEADLIGHT STEERING MECHANISM
Filed Oct. 11, 1923  2 Sheets-Sheet 1
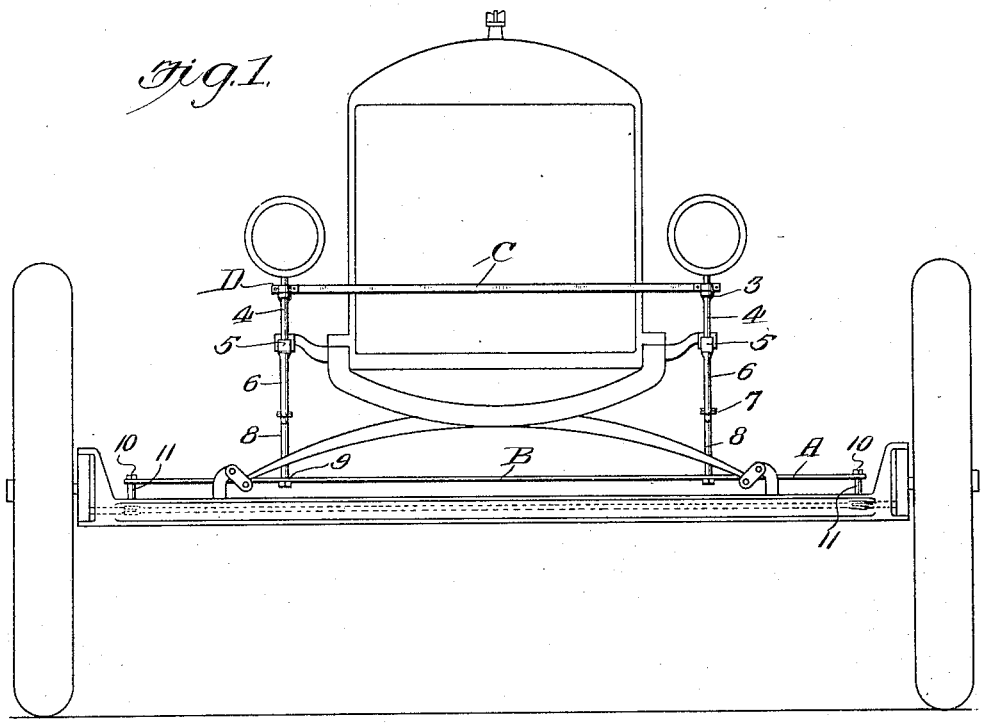
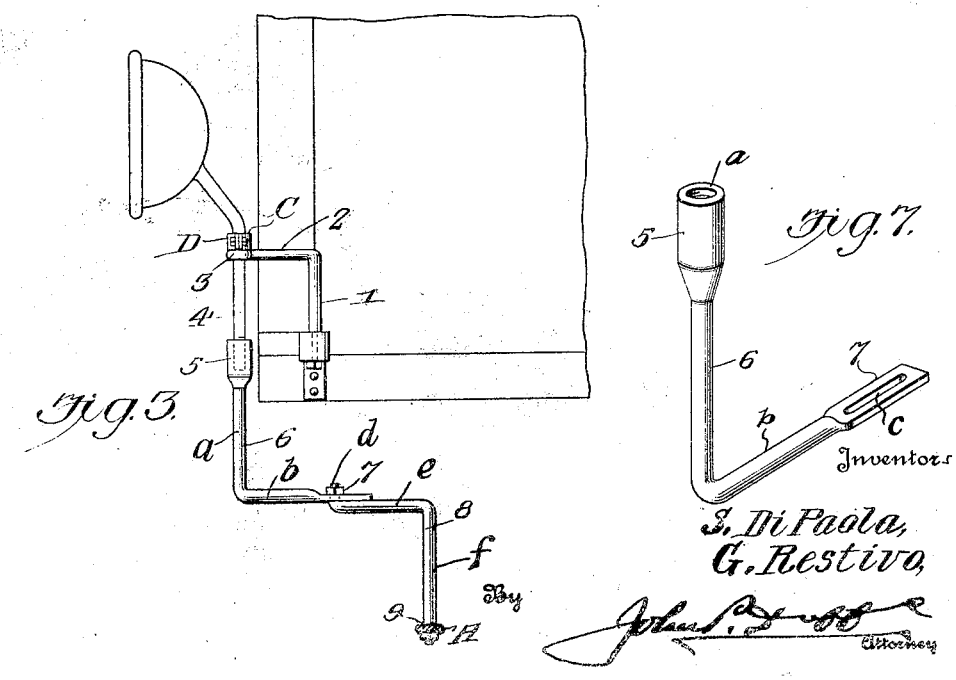
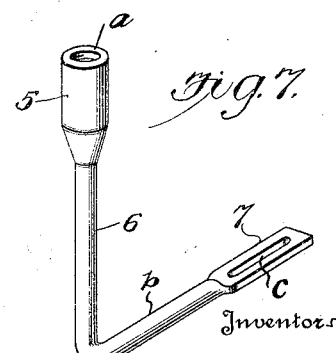
Inventors
S. Di Paola,
G. Restivo,
By
Attorney

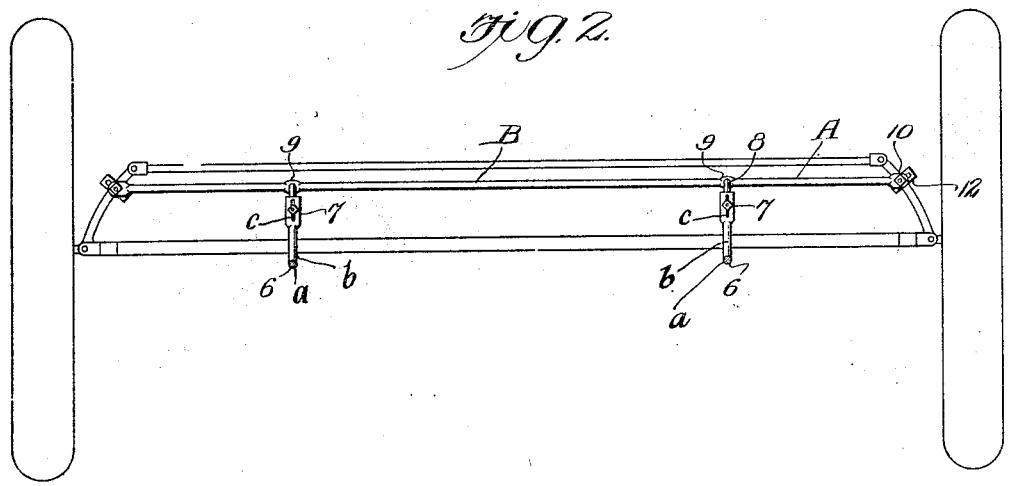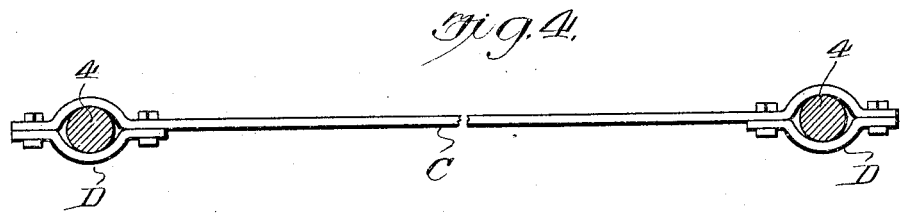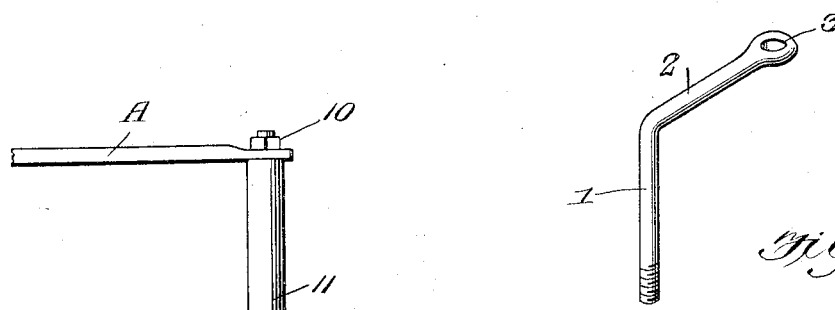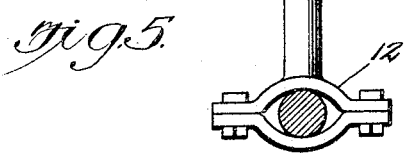

Patented Sept. 2, 1924.

1,507,163

UNITED STATES PATENT OFFICE.

SALVATORE DI PAOLA AND GIACOMO RESTIVO, OF FREEMANSPUR, ILLINOIS.

HEADLIGHT STEERING MECHANISM.

Application filed October 11, 1923. Serial No. 667,961.

*To all whom it may concern:*

Be it known that SALVATORE DI PAOLA and GIACOMO RESTIVO, subjects of the King of Italy, residing at Freemanspur, in the county of Williamson and State of Illinois, have invented certain new and useful Improvements in Headlight Steering Mechanism, of which the following is a specification.

This invention relates to headlight steering rigging adapted to be applied to automobile machines of the Ford type and it consists in the novel features hereinafter described and claimed.

An object of the invention is to provide a headlight rigging of simple and durable structure which when applied will cause the lights to follow the direction in which the steering wheels of the automobile machine are turned to reveal the road or path over which the machine is about to travel. When the steering wheels are turned to the right the lights are simultaneously turned to the right and when the steering wheels are turned to the left the lights are at the same time turned to the left.

With these objects in view the headlight rigging comprises studs adapted to be applied to the arms upon the knuckles of the steering gear of the automobile. A cross rod is pivotally connected at its ends with the said studs and bridges the space between them. Upstanding crank arms are mounted upon the cross rod and socketed crank arms are pivotally connected with the crank portions of the first mentioned crank arms. The shafts of the headlight casings are secured in the sockets of the socketed crank arms. Bracket extensions are mounted upon the brackets which are usually carried upon the frame of the automobile machine and the said bracket extensions have angularly disposed end portions. The outer portions thereof loosely receive the shafts and the inner portions are adapted to be applied to the brackets. A second cross rod is provided and this rod carries at its ends clips which frictionally engage the shafts but which permit the shafts to turn therein and the said rod bridges the space between the shafts.

In the accompanying drawings:

Figure 1 is a front view of an automobile machine with the headlight rigging applied thereto.

Figure 2 is a horizontal section of the front wheels and steering gear, taken above the front axle.

Figure 3 is a fragmentary side elevation of a portion of the automobile body and the corresponding headlight with our device applied.

Figure 4 is a horizontal section taken through the light casing shafts above the upper cross rod, the other parts of the machine and our device omitted.

Figure 5 is a detail fragmentary sectional view of one end of the lower cross rod and associated parts.

Figure 6 is a detail perspective view of one of the bracket extensions, and

Figure 7 is a similar view of one of the upper L-shaped crank arms.

As illustrated in the accompanying drawings the automobile headlight steering rigging comprises bracket extensions 1 which have angularly disposed end portions. The inner ends of the bracket extensions are secured in the brackets which are provided upon the frame of the automobile machine. The outer portions 2 of the brackets 1 are provided with openings or eyes 3. The headlight casings of the machine are provided with shafts 4 which are loosely received in the eyes 3. The lower ends of the shafts 4 are screwed into interiorly threaded cylindrical sockets 5 provided at the upper ends of the vertical portions $a$ of the vertically disposed L-shaped crank arms 6. The lower horizontal portions $b$ of the crank arms 6 are provided with elongated longitudinal slots $c$ and are loosely and pivotally connected, as at 7, to the vertical studs $d$ formed at the forward ends of the upper horizontal portions $e$ of the L-shaped crank arms 8, the lower ends of the vertical portions $f$ of which are fixed at points 9 to a cross rod A which is provided with an intermediate flat portion B. Nuts 10 secure the ends of the rod A to the upper ends of upright studs 11 and these studs are provided at their lower ends with curved clips 12 which clamp around the knuckle arms of the steering gear.

A second cross rod C is provided and this rod is flat or flexible and is provided at its ends with flexible clips D which bear against the sides of the shafts 4 as shown in Figure 4. Thus the parts are connected together and as the arms upon the steering knuckles are turned the headlight casings are turned in the same direction as that in which the steering wheels are turned and thus the roadway over which the machine is about to travel is lighted.

Having described the invention what is claimed, is:

An automobile headlight rigging comprising upright studs adapted to be applied to the knuckle arms of the steering gear, a cross rod pivotally connected at opposite ends with said studs, said cross rod provided adjacent opposite ends with flat enlargements formed with vertical openings, vertically disposed L-shaped crank arms mounted upon the ends of the cross rod with the lower ends of their vertical portions extending through said vertical openings, the forward ends of the horizontal crank portions of said crank arms formed with upwardly extending studs, other vertically disposed L-shaped crank arms formed in the outer ends of their horizontal portions with longitudinal slots receiving the studs of the crank portions of said first mentioned arms, interiorly threaded sockets formed at the upper ends of the vertical portions of said second mentioned crank arms, lamp shafts secured in said sockets, bracket extensions adapted to be applied to the frame of the automobile and loosely receiving the lamp shafts and a second cross rod extending between and connected with the upper ends of said lamp shafts.

In testimony whereof we affix our signatures.

SALVATORE DI PAOLA.
GIACOMO RESTIVO.